(12) United States Patent
Davis et al.

(10) Patent No.: US 9,495,633 B2
(45) Date of Patent: Nov. 15, 2016

(54) RECURRENT NEURAL NETWORKS FOR MALWARE ANALYSIS

(71) Applicant: Cylance Inc., Irvine, CA (US)

(72) Inventors: Andrew Davis, Irvine, CA (US);
Matthew Wolff, Irvine, CA (US);
Derek A. Soeder, Irvine, CA (US);
Glenn Chisholm, Irvine, CA (US);
Ryan Permeh, Irvine, CA (US)

(73) Assignee: CYLANCE, INC., Irvine, CA (US)

( * ) Notice: Subject to any disclaimer, the term of this patent is extended or adjusted under 35 U.S.C. 154(b) by 0 days.

(21) Appl. No.: 14/789,914

(22) Filed: Jul. 1, 2015

(65) Prior Publication Data

US 2016/0307094 A1    Oct. 20, 2016

Related U.S. Application Data

(60) Provisional application No. 62/148,652, filed on Apr. 16, 2015.

(51) Int. Cl.
*G06N 3/04* (2006.01)
*G06N 3/08* (2006.01)

(52) U.S. Cl.
CPC . *G06N 3/04* (2013.01); *G06N 3/08* (2013.01)

(58) Field of Classification Search
None
See application file for complete search history.

(56) References Cited

U.S. PATENT DOCUMENTS

| | | |
|---|---|---|
| 6,430,590 B1 | 8/2002 | Fischer |
| 6,546,551 B1 | 4/2003 | Sweeney et al. |
| 7,181,768 B1 * | 2/2007 | Ghosh ............... G06F 21/552 706/25 |
| 7,240,048 B2 | 7/2007 | Pontius |
| 7,937,705 B1 | 5/2011 | Prael et al. |
| 7,945,902 B1 | 5/2011 | Sahoo |
| 8,135,994 B2 | 3/2012 | Keromytis et al. |
| 8,347,272 B2 | 1/2013 | Sugawara et al. |
| 8,370,613 B1 | 2/2013 | Manadhata et al. |
| 8,549,647 B1 | 10/2013 | Mason et al. |
| 8,631,395 B2 | 1/2014 | Sathyanathan et al. |
| 8,818,923 B1 * | 8/2014 | Hoffmann ......... G06F 17/30985 706/18 |
| 8,930,916 B1 | 1/2015 | Soeder et al. |
| 9,262,296 B1 | 2/2016 | Soeder et al. |
| 2005/0049497 A1 | 3/2005 | Krishnan et al. |
| 2006/0112388 A1 | 5/2006 | Taniguchi et al. |

(Continued)

FOREIGN PATENT DOCUMENTS

EP    1762957 A1    3/2007

OTHER PUBLICATIONS

Jeffrey L. Elman, Finding Structure in Time, 1990, Cognitive Science, vol. 14, pp. 179-211.*

(Continued)

*Primary Examiner* — Alan Chen
(74) *Attorney, Agent, or Firm* — Mintz Levin Cohn Ferris Glovsky and Popeo, P.C.

(57) ABSTRACT

Using a recurrent neural network (RNN) that has been trained to a satisfactory level of performance, highly discriminative features can be extracted by running a sample through the RNN, and then extracting a final hidden state $h_i$, where i is the number of instructions of the sample. This resulting feature vector may then be concatenated with the other hand-engineered features, and a larger classifier may then be trained on hand-engineered as well as automatically determined features. Related apparatus, systems, techniques and articles are also described.

20 Claims, 1 Drawing Sheet

(56) References Cited

U.S. PATENT DOCUMENTS

| | | |
|---|---|---|
| 2008/0133571 A1 | 6/2008 | O'Sullivan et al. |
| 2008/0288965 A1 | 11/2008 | Grechanik et al. |
| 2009/0132449 A1 | 5/2009 | Nagashima |
| 2009/0133125 A1 | 5/2009 | Choi et al. |
| 2010/0082513 A1 | 4/2010 | Liu |
| 2010/0107170 A1 | 4/2010 | Stehley |
| 2010/0318999 A1 | 12/2010 | Zhao et al. |
| 2010/0325620 A1 | 12/2010 | Rohde et al. |
| 2011/0004574 A1 | 1/2011 | Jeong et al. |
| 2011/0138369 A1 | 6/2011 | Chandra et al. |
| 2012/0079490 A1 | 3/2012 | Bond et al. |
| 2012/0221497 A1 | 8/2012 | Goyal et al. |
| 2013/0103380 A1 | 4/2013 | Brandstatter et al. |
| 2013/0205279 A1 | 8/2013 | Osminer et al. |
| 2013/0227683 A1 | 8/2013 | Bettini et al. |
| 2013/0263097 A1 | 10/2013 | Dawson et al. |
| 2013/0291111 A1 | 10/2013 | Zhou et al. |
| 2014/0180738 A1 | 6/2014 | Phillipps et al. |
| 2014/0250429 A1 | 9/2014 | Greiner et al. |
| 2014/0379619 A1 | 12/2014 | Permeh et al. |
| 2015/0039543 A1* | 2/2015 | Athmanathan ..... H04L 63/1425 706/20 |
| 2015/0106310 A1* | 4/2015 | Birdwell ................ G06N 3/063 706/20 |
| 2015/0227741 A1 | 8/2015 | Permeh et al. |

OTHER PUBLICATIONS

"Data Type". *Wikipedia: The Free Encyclopedia*. Wikimedia Foundation, Inc. Jul. 20, 2015. Web. Jul. 20, 2015. URL: https://en.wikipedia.org/wiki/Data_type.

"File System". *Wikipedia: The Free Encyclopedia*. Wikimedia Foundation, Inc. Jul. 11, 2015. Web. Jul. 20, 2015. URL: https://en.wikipedia.org/wiki/File_system.

Bird, Steven et al. "Annotation Tools Based on the Annotation Graph API." Jul. 2001. 4 pages.

Dahl et al. "Large-Scale Malware Classification Using Random Projections and Neural Networks." *2013 IEEE International Conference on Acoustics, Speech and Signal Processing (ICASSP)*. May 26-31, 2013. Vancouver, BC. pp. 3422-3426.

De Campos, Luis M. et al. "Bayesian Networks Classifiers for Gene-Expression Data". *Intelligent Systems Design and Applications (ISDA)*. 2011 11th International Conference on, IEEE, Nov. 22, 2011, pp. 1200-1206, XP032086221, DOI: 10.1109/ISDA.2011.6121822 ISBN: 978-1-4577-1676-8.

Eagle. "Chapter 1: Introduction to Disassembly." *The IDA Pro Book: The Unofficial Guide to the World's Most Popular Disassembler*. San Francisco: No Starch Press. 2nd Edition(2011):3-14.

Iczelion. "Tutorial 1: Overview of PE File format." *Programming Horizon*. Jun. 1, 2013. Wayback Machine. Web. Feb. 23, 2015.

Inoue, Hajime "Anomaly Detection in Dynamic Execution Environments." Abstract of Dissertation. Jan. 31, 2005. XP055191583. ISBN: 978-0-54-249408-6. 190 pages. Retrieved from the Internet: URL:https://www.cs.unm.edu/~forrest/dissertations/inouedissertation.pdf [retrieved on May 26, 2015].

Nguyen, Hoan Anh et al. "A Graph-based Approach to API Usage Adaptation." *OOPSLA/SPLASH '10*. Oct. 17-21, 2010. Reno/Tahoe, Nevada, USA. Oct. 2010:(302-321).

Rieck et al. "Automatic analysis of malware behavior using machine learning." *Journal of Computer Security*. 19(2011):639-668.

Samak, Taghrid et al. "Online Fault and Anomaly Detection for Large-Scale Scientific Workflows". *High Performance Computing and Communications (HPCC)*, 2011 IEEE 13th International Conference on, IEEE, Sep. 2, 2011, pp. 373-381, XP032068211, DOI: 10.1109/HPCC.2011.55 ISBN: 978-1-4577-1564-8.

Shabtai, A et al. "Detection of malicious code by applying machine learning classifiers on static features: A state-of-the-art survey". *Information Security Technical Report*, Elsevier Advanced Technology. Amsterdam, NL, vol. 14, No. 1, Feb. 1, 2009, pp. 16-29, XP026144093, ISSN: 1363-4127.

Shin, DaeMin et al. Data Hiding in Windows Executable Files. *Proceedings of the 6th Australian Digital Forensics Conference*. Edith Cowan University. Perth Western Australia. Dec. 3, 2008. Research Online.

Stolfo, Salvatore J. et al. "Anomaly Detection in Computer Security and an Application to File System Accesses". In: "Lecture Notes in Computer Science". Jan. 31, 2005. M.S Hacid et al. (Eds):ISMIS 2005, LNAI. Springer. Berlin, Heidelberg. XP055192090. vol. 3488:14-28.

Wang, Xun et al. "Detecting Worms via Mining Dynamic Program Execution." Third International Conference on Security and Privacy in Communications Networks and the Workshops, 2007. SECURECOMM 2007. IEEE. Piscataway, NJ. USA. Sep. 17, 2007 pp. 412-421. XP031276575. ISBN: 978-1-4244-0974-7.

Xu, J.-Y. et al. "Polymorphic Malicious Executable Scanner by API Sequence Analysis." *Proceedings of the Fourth International Conference on Hybrid Intelligent Systems. (HIS 2004)*.Kitakyushu, Japan. Dec. 5-8, 2004. Piscataway, NJ, USA,IEEE, Dec. 5, 2004, pp. 378-383, XP010778797.

U.S. Appl. No. 14/673,605, Wojnowicz.

International Search Report and Written Opinion issued in International Application No. PCT/US2016/027885, dated Aug. 5, 2016.

Koutnik, Jan et a.."A Clockwork RNN." *Proceedings of the 31st International Conference on Machine Learning*. vol. 32. Feb. 14, 2014 (Feb. 14, 2014). pages 1863-1871. XP055289373.

Pascanu, Razvan. *On Recurrent and Deep Neural Networks*. Thesis. University of Montreal, May 2014. Montreal, Canada. Degree Granted on Feb. 18, 2015. Selected Chapters 1, 2 and 6. 87 pages. Web. Retrieved on Jul. 21, 2016.

Pascanu, Razvan et al. "Malware classification with recurrent networks." *2015 IEEE International Conference On Acoustics, Speech and Signal Processing (ICASSP)*. Apr. 19, 2015 (Apr. 19, 2015). pp. 1916-1920. ISBN: 978-1-4673-6997-8.

\* cited by examiner

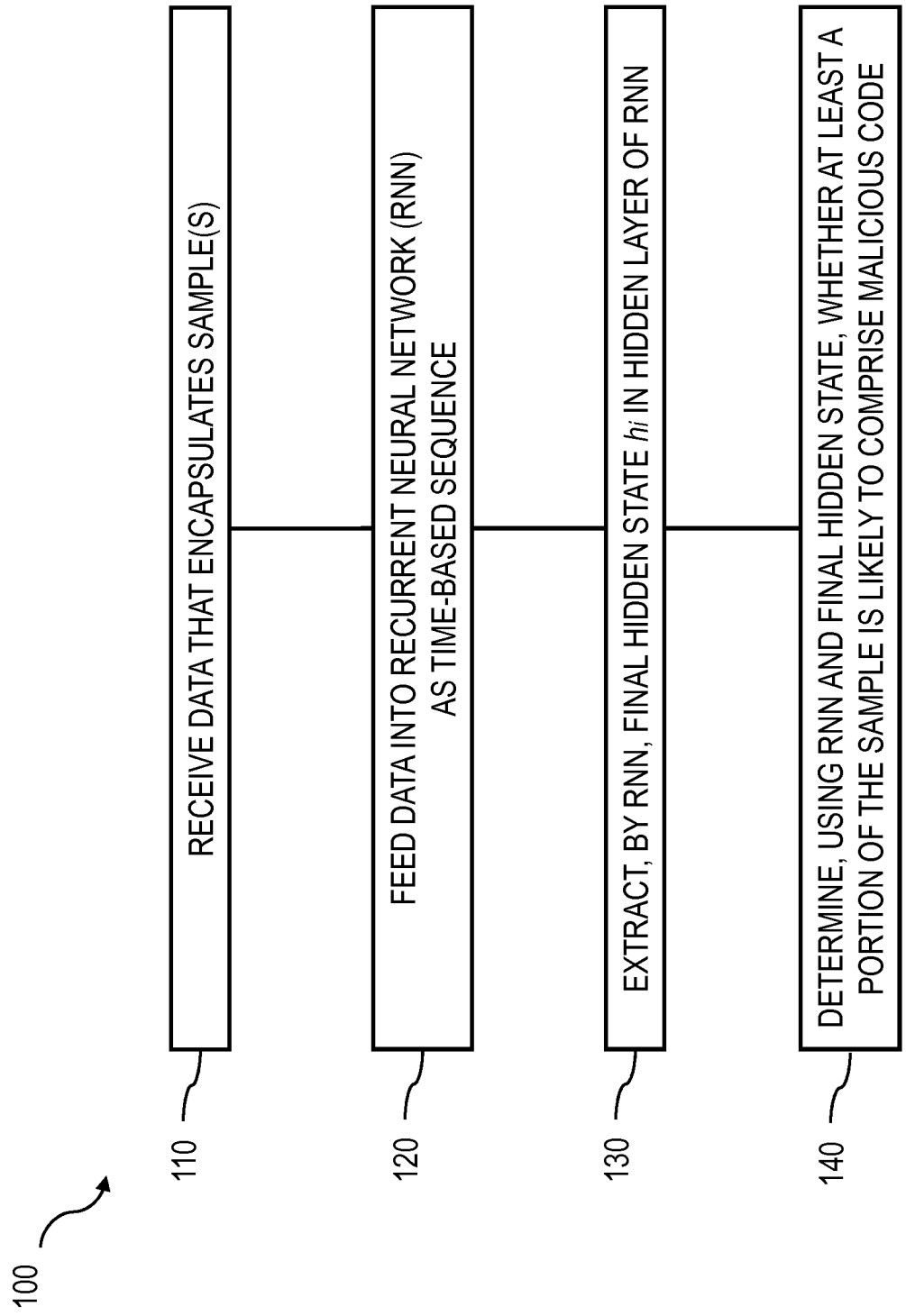

RECURRENT NEURAL NETWORKS FOR MALWARE ANALYSIS

RELATED APPLICATION

The current subject matter claims priority to U.S. Pat. App. Ser. No. 62/148,652 filed on Apr. 16, 2015, the contents of which are hereby fully incorporated by reference.

TECHNICAL FIELD

The subject matter described herein relates to the use of recurrent neural networks in connection with the analysis of malware.

BACKGROUND

In many machine learning implementations, much of the effort is expended on manually designing features for the purposes of simplifying the learning problem for the classifier. In the case that the inputs are variable-length, feature engineering is almost always required in order to turn the variable-length representation of the raw data into a fixed-length representation that a classifier (e.g., decision tree, logistic regression, neural network, etc.) can then use to make decisions about inputs. In this case, the usefulness of the classifier is almost entirely dependent on the ability of the domain experts to reduce an input of perhaps arbitrary length to a set of fixed descriptive features in a way that maintains predictive power.

SUMMARY

Using a recurrent neural network (RNN) that has been trained to discriminate between good and bad with a satisfactory level of performance, automatically discovered features can be extracted by running a sample through the RNN, and then extracting a final hidden state $h_i$, where i is the number of instructions of the sample. This resulting feature vector may then be concatenated with the other hand-engineered features, and a larger classifier may then be trained on hand-engineered as well as automatically determined features.

In one aspect, data is received or accessed that encapsulates a sample of at least a portion of one or more files. Subsequently, at least a portion of the received or accessed data is fed as a time-based sequence into a recurrent neural network (RNN) trained using historical data. Next, the RNN extracts a final hidden state $h_i$ in a hidden layer of the RNN in which i is a number of elements of the sample. It can then be determined, using the RNN and the final hidden state, whether at least a portion of the sample is likely to comprise malicious code.

The received or accessed data can form at least part of a data stream. At least a portion of the received or accessed data can be a series of fixed-length encoded words.

The elements in the received or accessed data can include a series of instructions.

The hidden state can be defined by: $h_t = f(x, h_{t-1})$, wherein hidden state $h_t$ is a time-dependent function of input x as well as a previous hidden state $h_{t-1}$.

The RNN can take many forms. In one example, the RNN is an Elman network. The Elman network can parameterize $f(x, h_{t-1})$ as $h_t = g(W_{1x} + Rh_{t-1})$; where hidden state $h_t$ is a time-dependent function of input x as well as previous hidden state $h_{t-1}$, $W_1$ is a matrix defining input-to-hidden connections, R is a matrix defining the recurrent connections, and $g(\cdot)$ is a differentiable nonlinearity.

An output layer can be added on top of the hidden layer, such that $o_t = \sigma(W_{2ht})$ where $o_t$ is output, $W_2$ defines a linear transformation of hidden activations, and $\sigma(\cdot)$ is a logistic function.

Backpropagation can be applied through time by which parameters of network $W_2$, $W_1$, and R are iteratively refined to drive the output $o_t$ to a desired value as portions of the received data are passed through the RNN.

The RNN can be a long short term memory network, a clockwork RNN, an Elman network with deep transition or decoding functions, and/or an echo-state network.

Data can be provided that characterizes the determination of whether the sample(s) contains malicious code. Providing data can include at least one of: transmitting the data to a remote computing system, loading the data into memory, or storing the data.

The accessed or received data can take many forms including, but not limited to, binary files and executable files.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter obviates the need for burdensome manual design of features for the purposes of simplifying learning problems for classifiers used in a variety of applications including malware analysis. In addition, the current subject matter can be used to discover non-obvious or non-intuitive patterns that a typical manual design process would likely miss.

The details of one or more variations of the subject matter described herein are set forth in the accompanying drawing and the description below. Other features and advantages of the subject matter described herein will be apparent from the description and drawings, and from the claims.

DESCRIPTION OF DRAWING

FIG. 1 is a diagram illustrating the determination of whether a sample of one or more data files is likely to contain malicious code using a recurrent neural network.

DETAILED DESCRIPTION

The current subject matter is directed to advanced machine learning methods that are trained using a very large corpus of malware in order to provide highly discriminative classifiers. In particular, the current subject matter uses recurrent neural networks (RNNs) such that in a model, a fixed-length encoding of words (or, in some cases, instructions) can be fed into the RNN as a sequence, which allows for the computation of a hidden state:

$$h_t = f(x, h_{t-1})$$

The hidden state $h_t$ is a time-dependent function of the input x as well as the previous hidden state $h_{t-1}$. The simplest RNN, an Elman network, parameterizes f (x, $h_{t-1}$) as $$h_t = g(W_1 x + R h_{t-1})$$

where $W_1$ is a matrix defining the input-to-hidden connections, R is a matrix defining the recurrent connections, and g (•) is a differentiable nonlinearity. More complicated and expressive parameterizations of this transition function exist (Long Short Term Memory networks, Clockwork RNNs, deep transition functions, echo-state networks, etc.) and can also be utilized.

The hidden state is made useful by adding an output layer on top of the hidden layer, such that $$o_t = \sigma(W_2 h_t)$$

where $W_2$ defines a linear transformation of the hidden activations, and σ (•) is the logistic function. By applying "backpropagation through time" (BPTT), an extension of backpropagation applied to the special case of RNNs, the parameters of the network $W_2$, $W_1$, and R can be iteratively refined to drive the output $o_t$ to the desired value (0 for a benign file, 1 for a malicious file) as the instructions are passed through the RNN.

Once the RNN is trained to a satisfactory level of performance, highly discriminative features can be extracted by running the sample through the RNN, and then extracting the final hidden state $h_i$, where i is the number of instructions of the sample. Alternatively, $h_i$ may be obtained by applying any sort of summary statistic (such as the mean, median, or max) on the elements of $h_t$ as t proceeds from 1 to i. This feature vector may then be concatenated with the other hand-engineered features, and a larger classifier may then be trained on hand-engineered as well as automatically determined features.

There are many ways an executable could be presented to the RNN. The simplest method would involve presenting the raw binary representation of the file, where a byte is encoded as a one-hot vector. In this case, the network architecture would contain 256 inputs. As an example, if the input byte for the current timestep is 0x25, the $37^{th}$ input would be set to 1, and all other inputs would be set to zero. This naive encoding has several potential downsides. First, the number of feed-forwards required in order to obtain a predicted label would be linear in the number of bytes of the file, which would complicate the deployment of such a model on and end user's machine. Second, many data files such as portable executables (PEs) contain long regions of very low entropy, particularly near the end of the file. Unless the RNN is capable of effectively ignoring these long regions by maintaining context over several hundreds or thousands of timesteps, the distinction between good and bad files quickly becomes ambiguous. Third, many PEs contain regions of very high entropy, corresponding to obfuscated or compressed data/instructions. These regions would require the RNN to implement de-obfuscation or decompression-like behavior. While certain exotic instantiations of RNNs are Turing-complete, expecting an RNN to learn to exhibit this behavior without a radical reformulation of the training of the RNN is a highly unreasonable expectation.

Because the main interest is in the execution behavior of the sample in question, a much more useful input representation would involve the disassembly of the PE. Starting from some point (typically the entry point, where the OS begins execution of the file), the disassembler follows the machine code, resulting in a trace of some of the executable code in the PE. There are some limitations—for example, the destination address of a conditional jump may only be decidable at run-time, so some code paths are difficult to trace, and implementing heuristics to discover unreachable code are error-prone.

The output of the disassembler gives a trace of machine instructions. By encoding these instructions, the disassembly data gives a better input-level encoding of the behavior of the program. In order to feed it into the RNN, the inputs of the network can simply be set to the bits of the instruction at timestep t. However, the x86 instruction set is variable length, and an instruction may be anywhere from 1 to 15 bytes. To accommodate this, the input size of the RNN may be set to the longest possible length of an instruction, and unused inputs at time t may simply be set to zero. Design trade-offs can be made to truncate the input length to 4 or 8 bytes per instruction, as longer x86 instructions are uncommon.

With the disassembly data, the RNN may learn the regularities and patterns behind common exploits and obfuscation methods in a very general and data-driven manner. The applicability of the approach would not be limited to Windows PEs—the RNN could be readily applied to other executable formats such as Linux ELFs and OSX/iOS Mach-Os. The approach may even be applicable to code that runs in virtual machines—for example, Java bytecode, .NET CIL, or LLVM IR code could be analyzed, so long as there exists a sufficiently large labeled dataset of samples.

The following applications/patents which are co-owned by the assignee of the current application are hereby fully incorporated by reference (and which detail various environments/techniques for which the current subject matter may be used in combination): "Automated System For Generative Multimodel Multiclass Classification and Similarity Analysis Using Machine Learning", application Ser. No. 14/313,863, filed Jun. 24, 2014; "Static Feature Extraction From Structured Files", application Ser. No. 14/169,808, filed Jan. 31, 2014; "Generation of API Call Graphs From Static Disassembly", application Ser. No. 14/169,841, filed Jan. 31, 2014; "Application Execution Control Utilizing Ensemble Machine Learning for Discernment", application Ser. No. 14/616,509, filed Feb. 6, 2015; and "Wavelet Decomposition of Software Entropy to Identify Malware", application Ser. No. 14/673,605, filed Mar. 30, 2015.

FIG. 1 is a diagram 100 in which, at 110, data is received or accessed that encapsulates a sample of at least a portion of one or more files. Thereafter, at 120, at least a portion of the received data is fed into a recurrent neural network (RNN) trained using historical data as a time-based sequence. The RNN then, at 130, extracts a final hidden state $h_i$ in a hidden layer of the RNN in which i is a number of elements of the sample. It is then determined, at 140, using the RNN and the final hidden state, whether at least a portion of the sample is likely to comprise malicious code.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A method comprising:
   receiving or accessing data encapsulating a sample of at least a portion of one or more files;
   feeding at least a portion of the received or accessed data as a time-based sequence into a recurrent neural network (RNN) trained using historical data;
   extracting, by the RNN, a final hidden state $h_i$ in a hidden layer of the RNN in which i is a number of elements of the sample; and
   determining, using the RNN and the final hidden state, whether at least a portion of the sample is likely to comprise malicious code.

2. The method of claim 1, wherein the received or accessed data forms at least part of a data stream.

3. The method of claim 1, wherein the at least a portion of the received or accessed data comprises a series of fixed-length encoded words.

4. The method of claim 1, wherein the elements comprises a series of instructions.

5. The method of claim 1, wherein the hidden state is defined by: $h_t = f(x, h_{t-1})$, wherein hidden state $h_t$ is a time-dependent function of input x as well as a previous hidden state $h_{t-1}$.

6. The method of claim 1, wherein the RNN is an Elman network.

7. The method of claim 6, wherein the Elman network has deep transition or decoding functions.

8. The method of claim 6, wherein the Elman network parameterizes $f(x, h_{t-1})$ as $h_t = g(W_1 x + R h_{t-1})$;
   where hidden state $h_t$ is a time-dependent function of input x as well as previous hidden state $h_{t-1}$, $W_1$ is a matrix defining input-to-hidden connections, R is a matrix defining the recurrent connections, and g (•) is a differentiable nonlinearity.

9. The method of claim 8 further comprising: adding an output layer on top of the hidden layer, such that $o_t = \sigma(W_2 h_t)$ where $o_t$ is output, $W_2$ defines a linear transformation of hidden activations, and σ (•) is a logistic function.

10. The method of claim 9 further comprising:
    applying backpropagation through time by which parameters of network $W_2$, $W_1$, and R are iteratively refined to drive the output $o_t$ to a desired value as portions of the received or accessed data are passed through the RNN.

11. The method of claim 1, wherein the RNN is a long short term memory network.

12. The method of claim 1, wherein the RNN is a clockwork RNN.

13. The method of claim 1, wherein the RNN is a deep transition function.

14. The method of claim 1, wherein the RNN is an echo-state network.

15. The method of claim 1 further comprising:
    providing data characterizing the determination.

16. The method of claim 15, wherein providing data comprises at least one of: transmitting the data to a remote computing system, loading the data into memory, or storing the data.

17. The method of claim 1, wherein the files are binary files.

18. The method of claim 1, wherein the files are executable files.

19. A system comprising:
   at least one programmable data processor; and
   memory storing instructions which, when executed by the at least one programmable data processor, result in operations comprising:
      receiving or accessing data encapsulating a sample of at least a portion of one or more files;
      feeding at least a portion of the received or accessed data as a time-based sequence into a recurrent neural network (RNN) trained using historical data;
      extracting, by the RNN, a final hidden state $h_i$ in a hidden layer of the RNN in which i is a number of elements of the sample; and
      determining, using the RNN and the final hidden state, whether at least a portion of the sample is likely to comprise malicious code.

20. A non-transitory computer program product storing instructions which, when executed by at least one programmable data processor forming part of at least one computing device, result in operations comprising:
   receiving or accessing data encapsulating a sample of at least a portion of one or more files;
   feeding at least a portion of the received or accessed data as a time-based sequence into a recurrent neural network (RNN) trained using historical data;
   extracting, by the RNN, a final hidden state $h_i$ in a hidden layer of the RNN in which i is a number of elements of the sample; and
   determining, using the RNN and the final hidden state, whether at least a portion of the sample is likely to comprise malicious code.

* * * * *